United States Patent
Barraco et al.

(10) Patent No.: US 8,893,562 B2
(45) Date of Patent: Nov. 25, 2014

(54) SYSTEM AND METHOD FOR DETECTING MAGNETIC NOISE BY APPLYING A SWITCHING FUNCTION TO MAGNETIC FIELD SENSING COILS

(75) Inventors: Ignazio Barraco, Munich (DE); Christopher Liston, Lisle, IL (US)

(73) Assignee: Methode Electronics, Inc., Chicago, IL (US)

( * ) Notice: Subject to any disclaimer, the term of this patent is extended or adjusted under 35 U.S.C. 154(b) by 427 days.

(21) Appl. No.: 13/301,356

(22) Filed: Nov. 21, 2011

(65) Prior Publication Data
US 2013/0125669 A1 May 23, 2013

(51) Int. Cl.
*G01L 3/00* (2006.01)
*G01L 3/10* (2006.01)

(52) U.S. Cl.
CPC ....................................... *G01L 3/102* (2013.01)
USPC ..................... 73/862.333; 73/862; 73/862.08; 73/862.193

(58) Field of Classification Search
USPC ..................... 73/862.333, 862.193
See application file for complete search history.

(56) References Cited

U.S. PATENT DOCUMENTS

| | | | | | |
|---|---|---|---|---|---|
| 4,896,544 | A | * | 1/1990 | Garshelis | 73/862.333 |
| 5,351,555 | A | * | 10/1994 | Garshelis | 73/862.335 |
| 5,520,059 | A | * | 5/1996 | Garshelis | 73/862.335 |
| 5,887,335 | A | * | 3/1999 | Garshells | 29/602.1 |
| 6,047,605 | A | * | 4/2000 | Garshelis | 73/862.336 |
| 6,145,387 | A | * | 11/2000 | Garshelis | 73/862.336 |
| 6,513,395 | B1 | * | 2/2003 | Jones | 73/862.333 |
| 6,553,847 | B2 | * | 4/2003 | Garshelis | 73/862.336 |
| 8,087,304 | B2 | * | 1/2012 | Lee | 73/862.333 |
| 2002/0124663 | A1 | * | 9/2002 | Tokumoto et al. | 73/862.333 |
| 2008/0116881 | A1 | * | 5/2008 | May | 324/207.12 |
| 2009/0230953 | A1 | * | 9/2009 | Lee | 324/244 |
| 2010/0301846 | A1 | * | 12/2010 | Lee | 324/207.25 |

\* cited by examiner

*Primary Examiner* — Lisa Caputo
*Assistant Examiner* — Jamel Williams
(74) *Attorney, Agent, or Firm* — Blank Rome LLP (57) ABSTRACT

A torque sensing device for measuring the torque applied to a rotatable shaft, and also measuring the magnetic field noise affecting the device. The device incorporates a switching function thereby enabling the device to operate in a common signal detection mode and a differential noise detection mode. The device is capable of determining the torque applied to the rotatable shaft based upon output signals obtained from magnetic field sensors operating in both the common signal detection mode and the differential noise detection mode. The device is capable of accurately measuring a torque induced magnetic field and is capable of canceling measurement error resulting from noise induced magnetic fields.

20 Claims, 6 Drawing Sheets

SYSTEM AND METHOD FOR DETECTING MAGNETIC NOISE BY APPLYING A SWITCHING FUNCTION TO MAGNETIC FIELD SENSING COILS

BACKGROUND OF THE INVENTION

1. Field of Invention

The present invention is related in general to systems and methods involving the use of magnetic field sensors. In particular, the invention is related to systems, methods, and apparata involving sensors and circuits that provide measurements of torque-induced magnetic fields, as well as magnetic field noise.

2. Description of the Related Art

In the control of systems having rotating drive shafts, torque and speed are fundamental parameters of interest. Therefore, the sensing and measurement of torque in an accurate, reliable, and inexpensive manner has long been a primary objective of such control system designs.

Previously, torque measurement was accomplished using contact-type sensors directly attached to a shaft. One such sensor is a "strain gauge" type torque detection apparatus, in which one or more strain gauges are directly attached to the outer peripheral surface of the shaft and a change in resistance caused by torque-induced strain is measured by a bridge circuit or other well known means. Contact-type sensors, however, are relatively unstable and of limited reliability due to the direct contact with the rotating shaft. In addition, they are expensive and are thus commercially impractical for competitive use in many applications, such as automotive steering or transmission systems, for which torque sensors are sought.

Subsequently, non-contact torque sensors of the magnetostrictive type were developed for use with rotating shafts. For example, U.S. Pat. No. 4,896,544 to Garshelis, which is incorporated herein by reference, describes a sensor comprising a torque-carrying member, with an appropriately ferromagnetic and magnetostrictive surface, two axially distinct circumferential bands within the member that are endowed with respectively symmetrical, helically-directed residual stress-induced magnetic anisotropy, and a magnetic discriminator device for detecting, without contacting the torqued member, differences in the response of the two bands to forces applied to the torque-carrying member. Torque is sensed using a pair of oppositely connected sensing coils for measuring a difference signal resulting from the external magnetic fluxes of the two bands. Unfortunately, providing sufficient space for the requisite excitation and sensing coils on and around the device on which the sensor is used can create practical problems in applications where space is at a premium. Also, such sensors may be impractically expensive for use on highly cost-competitive devices, such as in automotive applications.

Torque transducers based on measuring the field arising from the torque induced tilting of initially circumferential remanant magnetizations have been developed which, preferably, utilize a thin wall ring ("collar") serving as the field generating element. See, for example, U.S. Pat. Nos. 5,351,555 and 5,520,059 to Garshelis, which are incorporated herein by reference. Tensile "hoop" stress in the ring, associated with the means of its attachment to the shaft carrying the torque being measured establishes a dominant, circumferentially directed, uniaxial anisotropy. Upon the application of torsional stress to the shaft, the magnetization reorients and becomes increasingly helical as torsional stress increases. The helical magnetization resulting from torsion has both a radial component and an axial component, the magnitude of the axial component depending entirely on the degree of torsion. One or more magnetic field vector sensors may be used to sense the magnitude and polarity of the field arising, as a result of the applied torque, in the space above the magnetically conditioned regions on a shaft, and provide a signal output reflecting the magnitude and direction of the torque. Inasmuch as the peak allowable torque in a ring sensor is limited by slippage at the ring/shaft interface, concerns have been expressed regarding distortion arising from slippage at the ring/shaft interface under conditions of torque overload. This, together with the need for multiple parts of different materials to minimize the adverse effects of parasitic fields, has encouraged the investigation of alternative constructions.

Magnetoelastic torque transducers have been developed in which the active, torque sensing region is formed directly on the shaft itself, rather than on a separate ferromagnetic element which then has to be affixed to the shaft. See, for example, U.S. Pat. No. 6,047,605 to Garshelis, which is incorporated herein by reference. In one form of these so-called "collarless" transducers, the magnetoelastically active region is polarized in a single circumferential direction and itself possesses sufficient magnetic anisotropy to return the magnetization in the region, following the application of torque to the member, to the single circumferential direction when the applied torque is reduced to zero. The torqued shaft is desirably formed of a polycrystalline material wherein at least 50% of the distribution of local magnetizations lie within a 90-degree quadrant symmetrically disposed around the direction of magnetic polarization and have a coercivity sufficiently high that the transducing region field does not create parasitic magnetic fields in proximate regions of the shaft of sufficient strength to destroy the usefulness, for torque sensing purposes, of the net magnetic field seen by the magnetic field sensor. In particularly preferred forms of such transducers the shaft is formed of a randomly oriented, polycrystalline material having cubic symmetry and the coercivity is greater than 15 Oersted (Oe), desirably greater than 20 Oe and, preferably, greater than 35 Oe. Those characteristics may be achieved in large measure by selecting an appropriate ferromagnetic material for the shaft and active regions.

Because magnetic fields, in the context of their measurement, are fungible, the sensors taught by the above and other prior art may be susceptible to other magnetic fields of external origin. Magnetic fields of external origin are referred to as magnetic noise. In particular, the earth's magnetic field will cause a phenomenon known as "compassing," in which the measured field is the sum of the torque induced magnetic field and the earth's magnetic field. Within the context of this disclosure, the term "compassing" shall be used to describe any error resulting from the earth's magnetic field.

Magnetic fields of external origin can emanate from both far field and near field sources. A far field source, such as the earth with its magnetic field, generally has the same effect on each magnetic field sensor in a torque sensing device having multiple magnetic field sensors. Near field sources, such as permanent magnets, magnetized wrenches, motors, solenoids, etc., may create magnetic fields having significant local gradients, thus having significantly different effects on the different magnetic field sensors in a torque sensing device having multiple magnetic field sensors. Furthermore, the nearby presence of a ferromagnetic structure may distort the shape and direction of the earth's magnetic field, creating a localized area in which the magnetic flux is concentrated in an undesirable direction. Each of these examples results in a divergent magnetic field, i.e., one in which there are significant local gradients in both magnetic field strength and flux direction.

U.S. Pat. No. 5,520,059 to Garshelis addresses the compassing issue with respect to far field sources. In that patent, a shaft is described having two axially distinct magnetically conditioned regions, equally polarized in opposite circumferential directions. This arrangement yields two torque-dependent magnetic fields and, because the acquiescent magnetizations of the regions are in opposite directions, the torque-dependent magnetic fields are of equal but opposite magnetic polarity. Corresponding with the two regions described in the '059 patent are two magnetic field sensors, each with an opposite axial polarity to the other (but with the same polarity relative to each of the corresponding magnetically conditioned regions). Thus, an ambient magnetic far field affects each of the magnetic field sensors in an equal but opposite manner. Accordingly, by summing the outputs of the magnetic field sensors, measurements resulting from all common mode external magnetic fields, i.e. far fields, are canceled. In applications employing such a scheme, the oppositely polarized sensors should be placed as close to each other as possible to preserve the efficiency of the common mode rejection scheme. Sensors that are spaced from one another exhibit reduced common mode rejection efficiency, as the earth's magnetic field may be significantly distorted around ferromagnetic parts in and around the torque sensor.

While the teachings of the '059 patent are effective when dealing with far fields, a divergent near field can expose each of the two magnetic field sensors to distinctly different field intensities and direction. In this scenario, the two magnetic field sensor outputs will not reflect equal but opposite error components that cancel each other, but rather unequal and opposite components that introduce an error to the measurement. In practice, the configuration of the invention described in the '059 patent may be error-prone in the presence of locally divergent magnetic fields because the two magnetic field sensors experience different magnitudes of the divergent magnetic fields. The difference in magnetic fields between the two magnetic field sensors originating from a near field source combines non-uniformly with torque induced magnetic fields and leads to a false torque value. Thus, it is important to eliminate this near field effect.

There are numerous methods for canceling the effects of near field source or stray magnetic fields. These include employing shielding and using flux directors. Each of these types of structures is made from materials having a high magnetic permeability, meaning that they present a much lower resistance to magnetic fields than, for example, air. In principle, a shield would be in the form of a tube of infinite length, although shorter finite lengths may suitably function. Magnetic fields originating outside of the shield are effectively shunted through the highly permeable shield material, which prevents them from intersecting the field sensors.

While the shielding method noted above can be effective for external magnetic fields perpendicular to the axial direction of a shield in the form of a tube, this shield is very vulnerable to external magnetic fields in the axial direction of the tube which is open at both ends. Any external magnetic fields can transfer to the field sensors inside the shield through the sides of the shield which are open.

Using a different approach, a flux director "gathers" most of the torque dependent magnetic field and directs it into the magnetic field sensors. With this approach, the flux director geometry is such that its effectiveness of gathering the torque dependent magnetic field of interest is much greater than its effectiveness of gathering extraneous and error inducing magnetic fields, thus increasing the efficiency of the magnetic field sensors and hence, their signal to noise ratio.

Flux director structures typically operate by gathering the radial flux component of the torque dependent magnetic field, and are therefore well suited for rejecting axially directed flux of external origin, however, flux directors tend to be susceptible to external fields perpendicular to the axis of the shaft.

A combination of tubular shielding and flux directors would act in a complimentary manner by effectively mitigating both axially and radially directed fields of external origin acting directly on the field sensing devices. Such a combination, however, has other shortcomings that limit its desirability in many applications including cost and packaging within the design.

If an external magnetic field source is directly contacted with the end of a shaft such as the end of the column of an electric power steering system, a strong external near field could transfer to the field sensors through the shaft as a result of diametric variations in the shaft or nearby magnetically coupled structures such as, for example, a bearing or mounting flange. Moreover, a typical manufacturing process for a column or shaft may include a magnetic particle inspection (MPI) process that involves a magnetization process for guiding magnetic particles into the defect sites for visualization of defects on column surface, and a demagnetization process after finishing the inspection. Frequently, demagnetization is not perfect, and there remains a remanant magnetic field in the column or shaft after the MPI process. Typical values of the remanant magnetic fields are between 10 and 100 Gauss. This relatively large external magnetic field can be directly transferred to the field sensors inside the shield, and can be non-uniformly summed with the torque-induced magnetic fields, corrupting the torque measurement. This means that there is no totally effective way to protect or shield external magnetic fields propagating through the shaft with current techniques.

An additional disadvantage of the shielding method is that any deformation of the shield device caused by mechanical impact or extreme temperature change can affect the relative position of the field sensors and the shield, which can lead to unbalancing of far field values between two sensor fields operating in pairs that are oppositely oriented. This would result in compassing failure.

Furthermore, in most torque sensor applications, packaging space is limited, and in many cases there is no room for a shield or flux director. In addition, the added financial cost for those components is not insignificant because materials with high permeability tend to have high percentages of nickel, the pricing of which is quite volatile.

U.S. Pat. App. Pub. No. 2009/0230953 to Lee, which is incorporated herein by reference, describes a torque sensing device designed to cancel near field magnetic noise from external sources without canceling a torque-induced magnetic field. That reference describes a torque sensing device including a shaft having two identically axially polarized primary magnetic field sensors, circumferentially spaced proximate to a magnetically conditioned region on the shaft, the magnetically conditioned region polarized in a circumferential direction. The torque sensing device also includes two secondary magnetic field sensors, each of the secondary sensors evenly spaced from the primary sensors in opposite axial directions, proximate to the shaft, and axially spaced from the magnetically conditioned region such that the secondary sensors are not affected by torque-induced magnetic fields. The secondary sensors are polarized in a direction opposite the direction of polarization of the primary sensors. It is assumed that a near field noise source has its greatest effect on the secondary sensor nearest the source and its least effect to the secondary sensor farthest from the source. It is also assumed that the effect of the noise source on each of the primary sensors is equal to the average of the source's effect on each of the secondary sensors. Thus, by summing the outputs of the two primary and two secondary magnetic field sensors, the effect of the near field noise source is canceled, and the resulting composite signal is representative only of the torque-induced magnetic field.

The configuration of the invention described in the '953 publication can be error-prone in that its effectiveness is based on the assumption that noise-induced magnetic fields decrease linearly as distance from the noise source increases. In practice, however, noise-induced magnetic gradients are typically non-linear. In addition, because the design of the torque sensing device described in the '953 publication requires that the primary sensors be circumferentially spaced, the primary and secondary sensors described in that publication are not axially aligned. Axial alignment of the magnetic field sensors is preferred because such alignment increases the effectiveness of the torque sensing device.

What is needed, therefore, is a torque-sensing device that addresses the issue of torque applied to a rotatable shaft in the presence of a non-linear magnetic noise field gradient, wherein the device does not require additional magnetic shielding elements. What is also needed is a device specifically designed to measure both the torque-induced magnetic field and the noise-induced magnetic field at a time at which torque is applied to the shaft.

SUMMARY OF THE INVENTION

The present invention addresses the needs described above by providing a system, method, and apparata incorporating a switching function that allows for the multiple uses of individual magnetic field sensors, i.e. the same sensors are used to detect both noise and torque-induced signals, thus reducing the total number magnetic field sensors required to accurately measure torque while providing the same essential functions of multiple sensors with different functions.

It is a principal object of the present invention, therefore, to provide a torque sensing device that accurately measures the torque applied to a rotating shaft in the presence of a non-linear divergent magnetic noise field, without requiring magnetic shielding elements.

It is another object of the present invention to provide a torque sensing device that effectively cancels torque-induced measurements in order to measure the magnetic noise field affecting the torque sensing device.

It is still another object of the present invention to provide a torque sensing device having a reduced amount of space required for magnetic field sensors due to the ability of the magnetic field sensors to serve multiple functions in the operation of the torque sensing device.

Briefly described, those and other objects and features of the present invention are accomplished, as embodied and fully described herein, by a torque sensing device having a magnetoelastic torque-sensing magnetic field transducer having a first magnetically conditioned region and a second, oppositely polarized magnetically conditioned region; a first magnetic field sensing device positioned proximate to the first magnetically conditioned region; a second magnetic field sensing device positioned proximate to the second magnetically conditioned region; means for switching between a first connection state and a second connection state, wherein, in the first connection state, the first magnetic field sensing device and the second magnetic field sensing device are oppositely polarized, and wherein, in the second connection state, the first magnetic field sensing device and the second magnetic field sensing device are polarized in the same direction.

The above objects and features of the present invention are accomplished, as embodied and fully described herein, by a method for determining the amount of torque applied to a torque sensing device including the steps of: providing a magnetoelastic torque to magnetic field transducer having a first magnetically conditioned region and a second, oppositely polarized magnetically conditioned region; providing a first magnetic field sensor positioned proximate to the first magnetically conditioned region, the first magnetic field sensor having a sensitive direction; providing a second magnetic field sensor positioned proximate to the second magnetically conditioned region, the second magnetic field sensor having a sensitive direction; configuring the first and second magnetic field sensors in a first connection state wherein the sensitive directions of the first and second magnetic field sensors are opposite one another; obtaining first output signals from each of the first and second magnetic field sensors in the first connection state; applying a switching function to reconfigure first and second magnetic field sensors into a second connection state wherein the sensitive directions of the first and second magnetic field sensors are identical; obtaining second output signals from each of the first and second magnetic field sensors in the second connection state; and calculating the torque applied to the torque sensing device based on the first and second output signals.

With those and other objects, advantages, and features of the invention that may become hereinafter apparent, the nature of the invention may be more clearly understood by reference to the following detailed description of the invention, the appended claims and to the several drawings attached herein.

DETAILED DESCRIPTION OF THE PREFERRED EMBODIMENTS

Several preferred embodiments of the invention are described for illustrative purposes, it being understood that the invention may be embodied in other forms not specifically shown in the drawings. The figures will be described with respect to the system structure and methods for using the system to achieve one or more of the objects of the invention.

Figure 1:
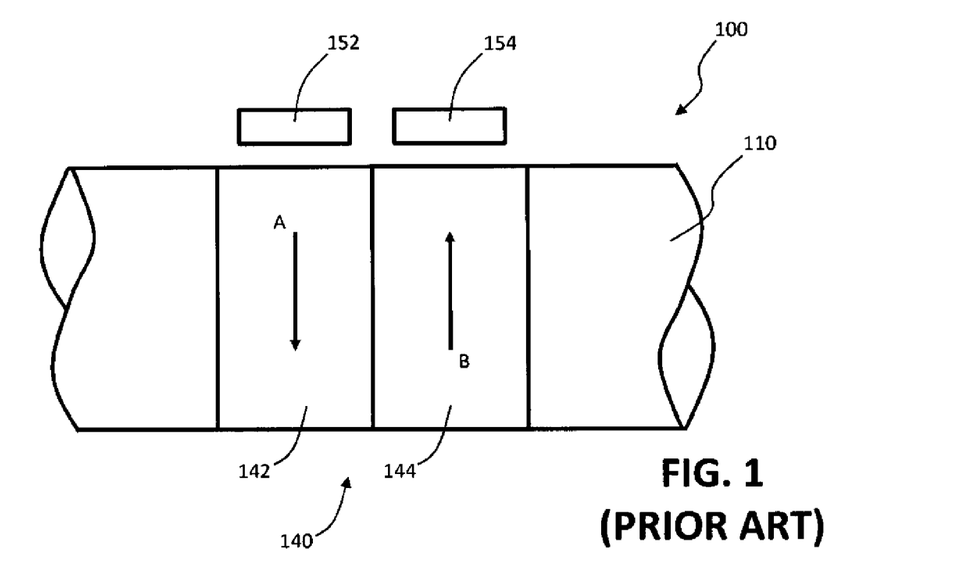
FIG. 1 is a side view of a torque sensing device in accordance with an embodiment of the present invention, wherein the torque sensing device is in the quiescent state.

Turning first to FIG. 1, shown therein is a side view of a cylindrical shaft 110 in accordance with a "dual-band" embodiment of the torque sensing device 100 of the present invention. The shaft 110 may be rotatable about its central longitudinal axis, or may be static. A torque applied at one portion of the shaft 110 is transmitted thereby to another portion of the shaft 110 wherein the application of the torque results in the performance of some useful work. The motion of the shaft 110, or the applied torque 110 may be in a clockwise or counterclockwise direction when looking upon an end of the shaft 110, and may be in either or both directions depending on the nature of the machine incorporating the shaft 110.

The shaft 110 may be completely solid, or may be partially hollow. The shaft 110 may be formed of a homogeneous material or may be formed of a mixture of materials. The shaft 110 is, or at least includes, a magnetoelastically active region 140, which allows the shaft to act as a magnetoelastic torque to magnetic field transducer. The magnetoelastically active region 140 may be an integral and homogeneous part of the shaft 110, or it may be comprised by a ring or collar firmly attached to the shaft 110. The Garshelis '605 patent describes methods for providing shafts with magnetoelastically active regions 140, which are applicable to the present invention.

The material selected for forming the magnetoelastically active region 140 must be at least ferromagnetic to ensure the existence of magnetic domains for at least forming a remanant magnetization in the magnetoelastically active region 140, and must be magnetorestrictive such that the orientation of magnetic field lines in the magnetoelastically active region 140 may be altered by the stresses associated with applied torque.

The magnetoelastically active region 140 comprises at least two axially distinct oppositely polarized magnetically conditioned regions 142, 144, defining the magnetoelastically active region 140 of the torque sensing device 100. The magnetically conditioned regions 142, 144 are magnetically polarized in opposite circumferential directions by any effective method, several of which are described in the Garshelis '059 patent. Preferably, the circumferential polarization of the magnetically conditioned regions 142, 144 is such that, in the absence of torque applied to the shaft 110 (in the quiescent state), the magnetically conditioned regions 142, 144 have no net magnetization components in the axial or radial directions. Arrows A, B in FIG. 1 show exemplary directions of polarization of the magnetically conditioned regions 142, 144 when the torque sensing device 100 is in the quiescent state.

Figure 2:
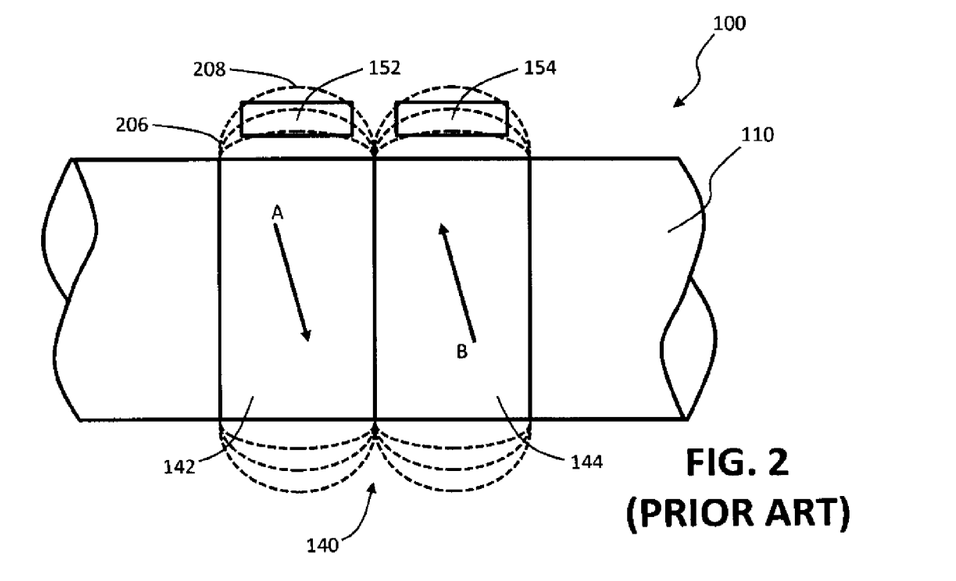
FIG. 2 is a side view of a torque sensing device in accordance with an embodiment of the present invention, wherein the torque sensing device is subject to an applied torque.

FIG. 2 shows the torque sensing device 100 in a state in which a torque has been applied to the shaft 110. Due to the construction and processing of the torque sensing device 100, specifically the magnetoelastic properties of the magnetoelastically active region 140, the application of torsional stress to the shaft 110 and thus to the magnetoelastically active region 140 causes reorientation of the polarized magnetization in the magnetically conditioned regions 142, 144 such that the magnetic domains align with the principal stress axes. In other words, when a torque is applied to the shaft 110, the magnetically conditioned regions 142, 144 may exhibit torque-induced magnetization components in the radial or axial directions or both. Of particular importance is that the magnitudes of both the radial and axial components depend entirely upon the torque applied to the shaft 110, while the flux direction, or polarity, of both the radial and axial components are dependent upon the direction in which the torque is applied to the shaft 110. The magnetoelastically active region 140 is constructed and processed such that the torque-induced magnetic fields emanating from each of the magnetically conditioned regions 142, 144 are of equal magnitude, but opposite polarity to one another. Arrows A, B in FIG. 2 show the reorientation of the magnetization in the magnetically conditioned regions 142, 144 when torque is applied to the shaft 110. FIG. 2 also shows an external magnetic flux caused by torque applied to the shaft 110, where the external magnetic flux can be described in terms of a radial component 206 and an axial component 208.

With continued reference to FIGS. 1, and 2, magnetic field sensors 152, 154 are axially aligned, positioned proximate to the magnetically conditioned regions 142, 144, respectively. Each individual magnetic field sensor 152, 154 corresponds to an individual magnetically conditioned region 142, 144. The magnetic field sensors 152, 154 are oriented so as to sense the magnitude and polarity of the axial and/or radial field components arising in the spaces about the magnetically conditioned regions 142, 144 as a result of the reorientation of the polarized magnetization from the quiescent circumferential direction to a generally helical direction. The magnetic field sensors 152, 154 provide signal outputs reflecting the magnitude of the torque applied to the shaft 110. The magnetic field sensors preferably comprise one or more solid state sensing devices, such as Hall Effect, magnetorestance, magnetotransistor (magnistor), magnetodiode, or MAGFET (Magnetic Field Effect Transistor) field sensors. Other possible field sensors include non-linear cores, having magnetic properties varying with H (defined as a magnetizing force), magnetometers, and flux gate magnetometers, and coils (either encircling or proximate, intercepting flux and having an induced EMF proportional to $d\Phi/dt$, or change in magnetic flux over change in time). One or more conductors connect each magnetic field sensor 152, 154 to a source of direct or alternating current power or excitation signal, and transmit the signal output of the magnetic field sensors 152, 154 to a receiving device, such as a control or monitoring circuit for the machine or system incorporating the shaft 110. The magnetic field sensors 152, 154 are preferably configured such that the representative signals outputted by the magnetic field sensors 152, 154 vary linearly with respect to variations in the torque applied to the shaft 110.

Each magnetic field sensor 152, 154 could be configured to have an amorphous wire core. The amorphous wire has a property that causes the magnetic permeability to drop to 1 when fully saturated by a magnetic field. The magnetic field is the sum of the field generated by excitation of the coil windings and any magnetic field originating from external sources such as the earth's magnetic field or nearby sources such as motors, current carrying conductors, etc. In the application of interest, the magnetic field also has a component that originates from the magnetoelastically conditioned region 140 that is proportional to the amount of torque applied to the shaft 110. When the amorphous core of each magnetic field sensor 152, 154 saturates, the resulting sudden drop in permeability results in a corresponding change in the inductance of the magnetic field sensor 152, 154. The magnetic field sensors 152, 154 are each connected to circuitry that serves two functions, to excite the magnetic field sensors 152, 154 and to detect when their inductances change in relation to the excitation signal. Additional circuitry connected to the magnetic field sensors 152, 154 is capable of outputting a DC voltage signal that is representative of the strength and polarity of a sensed magnetic field.

FIGS. 1 and 2 each show the torque sensing device 100 having only one pair of magnetic field sensors 152, 154. However, the torque sensing device 100 may include a plurality of magnetic field sensor pairs circumferentially spaced about the shaft 110, and proximate to the magnetoelastically active region 140. The use of a plurality of magnetic field sensor pairs allows for a greater number of simultaneous torque measurements to be analyzed, which may increase the overall accuracy of the torque sensing device 100, among other advantages.

The present invention is characterized by the capability of the magnetic field sensors 152, 154 to operate in each of two connection states, common mode (signal detection mode) and differential mode (noise detection mode). The present invention includes a switching circuit by which operation of the magnetic field sensors may be switched from common mode to differential mode, and vice versa. In the common mode connection state, the magnetic field sensors 152, 154 are connected in a series/parallel configuration such that the same excitation sine wave through each of the magnetic field sensors 152, 154 will coincide with oppositely polarized magnetic fields. In the differential mode connection state, the magnetic field sensors 152, 154 are connected in a series/parallel configuration such that the same excitation sine wave through each of the magnetic field sensors 152, 154 will coincide with identically polarized magnetic fields.

Figure 3:
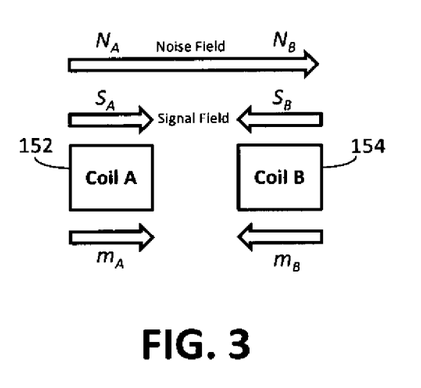
FIG. 3 is a diagram exemplifying a common mode configuration for magnetic field sensors in accordance with an embodiment of the present invention.

Turning to FIG. 3, shown therein is a diagram of the magnetic field sensors 152, 154 of the present invention operating in the aforementioned common mode state. In that state, the magnetic field sensors 152, 154 are referred to as Coil A and Coil B, respectively. $N_A$ and $N_B$ indicate the magnetic noise fields sensed by Coil A and Coil B, respectively. $S_A$ and $S_B$ indicate the torque-induced magnetic fields sensed by Coil A and Coil B, respectively. Due to the construction and processing of the magnetoelastically active region 140, $S_A$ and $S_B$ are of equal magnitude and opposite direction. Arrows $m_A$ and $m_B$ indicate the sensitive directions, or positive directions of field measurement, of Coil A and Coil B, respectively. When operating in common mode, the magnetic field sensors 152, 154 are oriented such that $m_A$ and $m_B$ are opposite one another. As shown in FIG. 3, when operating in common mode, Coil A senses a signal that is equal to $S_A+N_A$, and Coil B senses a signal that is equal to $S_B-N_B$.

Magnetic noise fields may be caused by far field noise sources, near field noise sources, or both. When a magnetic noise field is exclusively the result of a far field noise source and no distortion of the magnetic noise field occurs, $N_A$ and $N_B$ are of equal magnitude and direction. In such instances, the effect of magnetic noise on the torque sensing device 100 is canceled by summing the output signals obtained from Coil A and Coil B in common mode. The resulting composite output signal is represented by $S_A+N_A+S_B-N_B=S_A+S_B=2S_A=2S_B$. Because the composite output signal is entirely torque-induced, one can easily determine the magnitude of torque applied to the shaft 110 based on the composite output signal. This technique, as noted above, is typically referred to as common mode rejection.

In typical practice, however, due to the presence of near field noise sources, the distortion of noise fields caused by far field sources, the inability of Coil A and Coil B to occupy the same physical space, the possible axial misalignment of Coil A and Coil B, and the physical manufacturing and assembly tolerances of Coil A and Coil B, the magnetic noise fields sensed by Coil A and Coil B will not be of equal magnitude. In other words, typically $N_A \neq N_B$. In such cases, the composite output signal obtained by summing the individual output signals of Coil A and Coil B in common mode is equal to $S_A+N_A+S_B-N_B=2S_A+N_A-N_B=2S_B+N_A-N_B$. In this case, the effect of magnetic field noise is not canceled and common mode rejection techniques fall short of obtaining a signal that accurately reflects the magnitude of the torque applied to the shaft 110. In other words, in the common mode connection state, the sensed field output is the sum of the torque-induced magnetic fields minus the common mode external noise fields plus external noise fields local to one or both of the magnetic field sensors 152, 154. This is the traditional mode of operation, with the advantage that it effectively subtracts all common mode external magnetic noise fields, and the disadvantage that it cannot subtract external magnetic noise fields that are local to one or both of the magnetic field sensors 152, 154.

Figure 4:
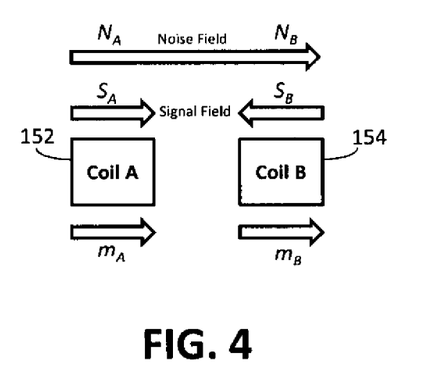
FIG. 4 is a diagram exemplifying a differential mode configuration for magnetic field sensors in accordance with an embodiment of the present invention.

Turning to FIG. 4, therein is shown a diagram of the magnetic field sensors 152, 154 of the present invention operating in differential mode. The magnetic field sensors 152, 154 are again referred to as Coil A and Coil B, respectively. $N_A$ and $N_B$ indicate the magnetic noise fields sensed by Coil A and Coil B, respectively. $S_A$ and $S_B$ indicate the torque-induced magnetic fields sensed by Coil A and Coil B, respectively. Due to the construction and processing of the magnetoelastically active region 140, $S_A$ and $S_B$ are of equal magnitude and opposite direction. Arrows $m_A$ and $m_B$ indicate the sensitive directions, or positive directions of field measurement, of Coil A and Coil B, respectively. When operating in differential mode, the magnetic field sensors 152, 154 are oriented such that $m_A$ and $m_B$ are identical. As shown in FIG. 4, when operating in differential mode, Coil A senses a signal that is equal to $S_A+N_A$, and Coil B senses a signal that is equal to $-S_B+N_B$.

In the typical situation where $N_A \neq N_B$, the effect of the torque-induced magnetic field on the torque sensing device 100 is canceled by summing the output signals obtained from Coil A and Coil B in differential mode. The resulting composite output signal is equal to $S_A+N_A-S_B+N_B=N_A+N_B$. The sensed field output is equal to the torque-induced magnetic field from one of the magnetically conditioned regions 144, 142 subtracted from the torque-induced magnetic field from the other magnetically conditioned region 142, 144 plus the sum of the external magnetic noise field sensed at both of the magnetic field sensors 152, 154. Therefore, when operating in differential mode, the present invention is capable of measuring the undesirable magnetic field noise that affects the pair of magnetic field sensors 152, 154.

Figure 5:
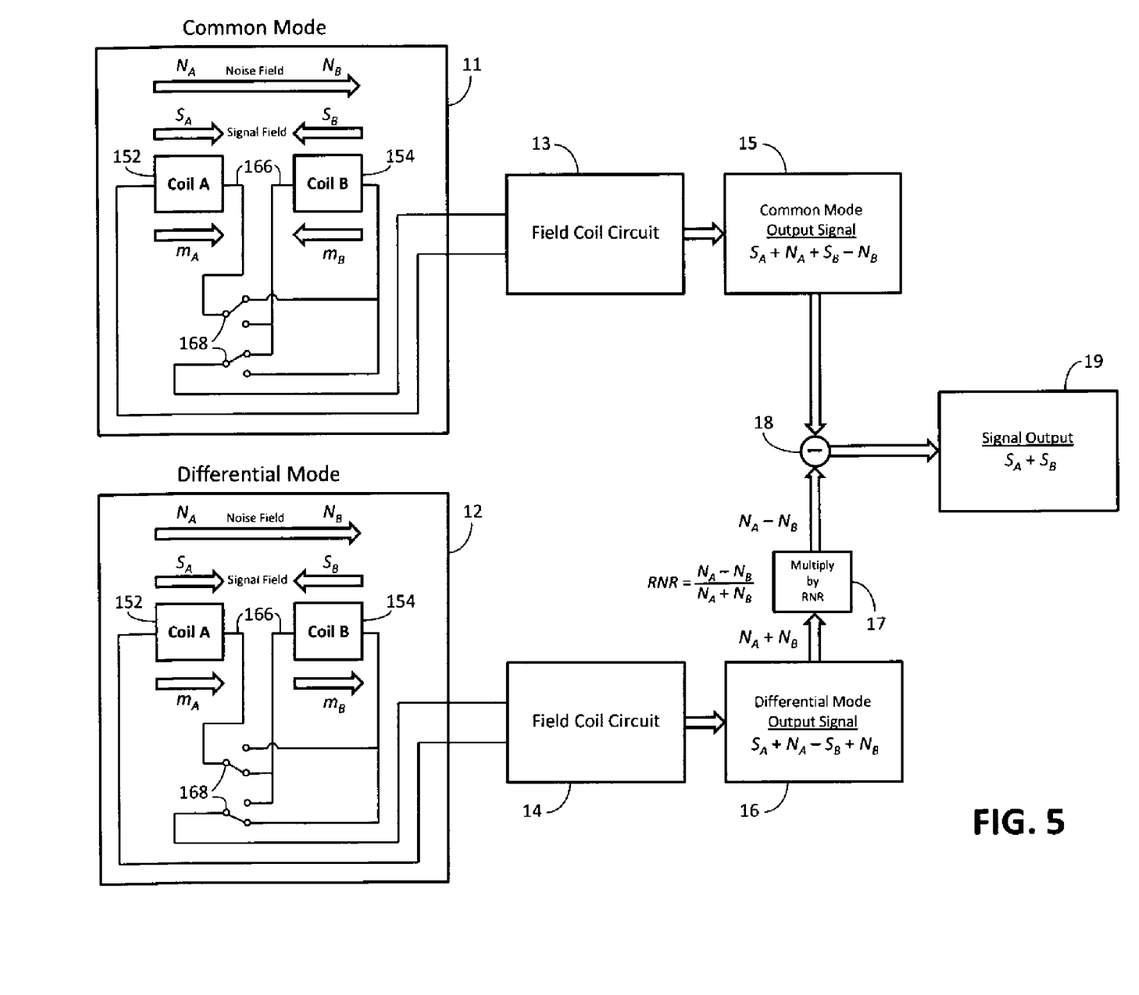
FIG. 5 is a block diagram demonstrating the operation of an embodiment of the present invention.

Turning now to FIG. 5, shown therein is a block diagram depicting the operation of the present invention. Referring to block 11, Coil A of field sensor 152 and Coil B of field sensor 154 are shown axially aligned, connected in series by conductors 166. Block 11 shows Coil A and Coil B configured in common mode (signal detection mode), with their sensitive directions $m_A$, $m_B$ opposite one another. Coil A and Coil B provide output signals to a field coil circuit, represented by block 13 in common mode, which processes the output signals obtained from the magnetic field sensors 152, 154. The individual output signals obtained from Coil A and Coil B are summed, resulting in a composite common mode output signal represented by block 15. The present invention includes a memory or other storage device (not shown) for storing each of the output signals obtained during common mode operation.

With continued reference to FIG. 5, Block 12 shows Coil A and Coil B configured in differential mode (noise detection mode). Coil A and Coil B are shown axially aligned, connected in series by conductors 166, as in the common mode described above. Unlike the common mode, however, in differential mode, the sensitive directions $m_A$, $m_B$ of Coil A and Coil B are identical. Coil A and Coil B provide output signals to the field coil circuit, represented by block 14 in differential mode, which processes the output signals obtained from the magnetic field sensors 152, 154. The individual output signals obtained from Coil A and Coil B are summed, resulting in a composite differential mode output signal represented by block 16. The present invention includes a memory or other storage device (not shown) for storing each of the output signals obtained during differential mode operation.

The transition from common mode to differential mode is achieved by switching the sensitive direction $m_B$ of Coil B from a common mode to a differential mode orientation. Switching may be performed by any appropriate electrical or mechanical means. In FIG. 5, the transition from common mode to differential mode is facilitated by switches 168 that, when activated, effectively reverse the sensitive direction $m_B$ of Coil B. To ensure proper functionality of the torque sensing device 100, the switching frequency of the circuit incorporating the magnetic field sensors 152, 154 should be greater than the circuit bandwidth.

With continued reference to FIG. 5, the composite differential mode output signal (block 16) is multiplied by the residual noise ratio (RNR) to obtain the product represented by block 17. That product (block 17) is processed through a subtraction circuit (block 18) and thereby subtracted from the composite common mode output signal (block 15). The resulting difference (block 19) is a measure of the torque-induced magnetic field, with the effects of all noise-induced magnetic fields removed. The mathematical operations required for the operation of the present invention may be performed by any appropriate means including discrete components, microcontroller, or state machine that are well known in the art.

The residual noise ratio may be determined by the following procedure. It should only be necessary to perform the following procedure once for each instance of the invention, as part of the initial prototype development and evaluation process. In determining the residual noise ratio, a controlled divergent magnetic field source is used.

1) With the controlled divergent magnetic field source turned OFF, apply a steady state torque to the torque sensing device 100, and:
   a. In common mode, obtain a baseline common mode output signal measurement: $(S_A+S_B+N_A-N_B)_{off}$.
   b. In differential mode, obtain a baseline differential mode output signal measurement: $(S_A-S_B+N_A+N_B)_{off}$.
2) With the controlled divergent magnetic field source turned ON, maintain the application of the steady state torque from step 1, and:
   a. In common mode, obtain a second common mode output signal measurement: $(S_A+S_B+N_A-N_B)_{on}$.
   b. Measure the peak to peak amplitudes of any repetitive waveforms shown in the common mode output signal.
   c. In differential mode, obtain a second differential mode output signal measurement: $(S_A-S_B+N_A+N_B)_{on}$.
   d. Measure the peak to peak amplitudes of any repetitive waveforms shown in the differential mode output signal.
3) Calculate the difference between the common mode values obtained in steps 2(a) and 1(a): $[(S_A+S_B+N_A-N_B)_{on}-(S_A+S_B+N_A-N_B)_{off}]=\Delta(N_A-N_B)$.
4) Calculate the difference between the differential mode values obtained in steps 2(c) and 1(b): $[(S_A+S_B+N_A+N_B)_{on}-(S_A-S_B+N_A+N_B)_{off}]=\Delta(N_A+N_B)$.
5) Determine the residual noise ratio, which is the greater of the measurement obtained in step 3 divided by the measurement obtained in step 4; and the measurement obtained in step 2(b) divided by the measurement obtained in step 2(d).

The residual noise ratio may be expressed as $(N_A-N_B)/(N_A+N_B)$.

Figure 6:
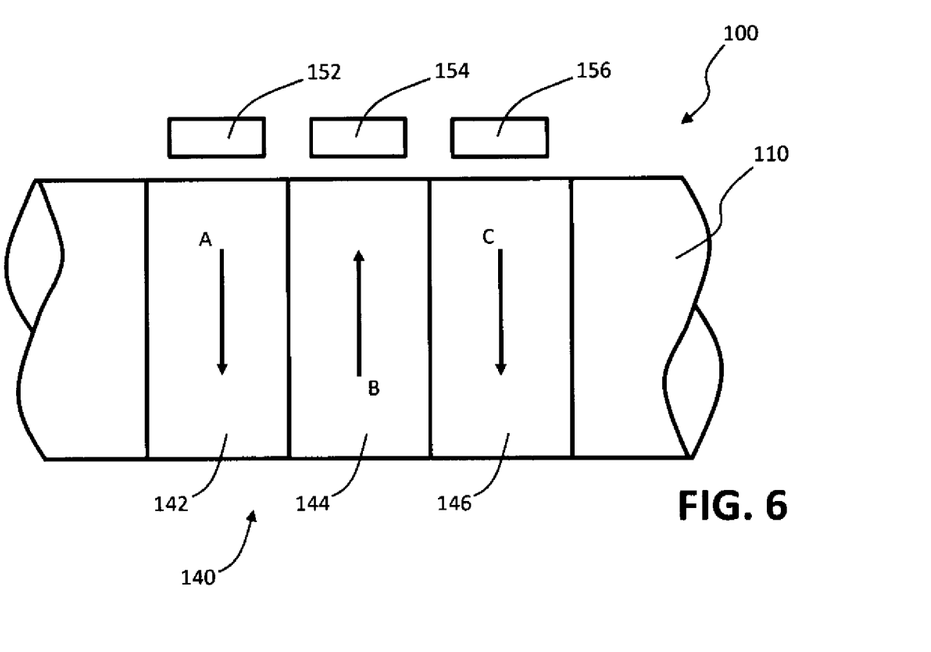
FIG. 6 is a side view of a torque sensing device in accordance with another embodiment of the present invention, wherein the torque sensing device is in the quiescent state.

Turning to FIG. 6, shown therein is a side view of the cylindrical shaft 110 in accordance with a "tri-band" embodiment of the torque sensing device 100 of the present invention. FIG. 6 differs from FIG. 1 in that FIG. 6 depicts the shaft 110 having a magnetoelastically active region 140 defined by three axially distinct magnetically conditioned regions 142, 144, 146. The outermost magnetically conditioned regions 142, 146 are magnetically polarized in identical substantially circumferential directions. The central magnetically conditioned region 144 is magnetically polarized in a substantially circumferential direction opposite that of the outermost magnetically conditioned regions 142, 146. Preferably, the circumferential polarization of the magnetically conditioned regions 142, 144, 146 is such that, in the in the quiescent state, the magnetically conditioned regions 142, 144, 146 have no net magnetization in the axial or radial directions. Arrows A, B, C in FIG. 6 show exemplary directions of polarization of the magnetically conditioned regions 142, 144, 146 when the torque sensing device 100 is in the quiescent state.

Figure 7:
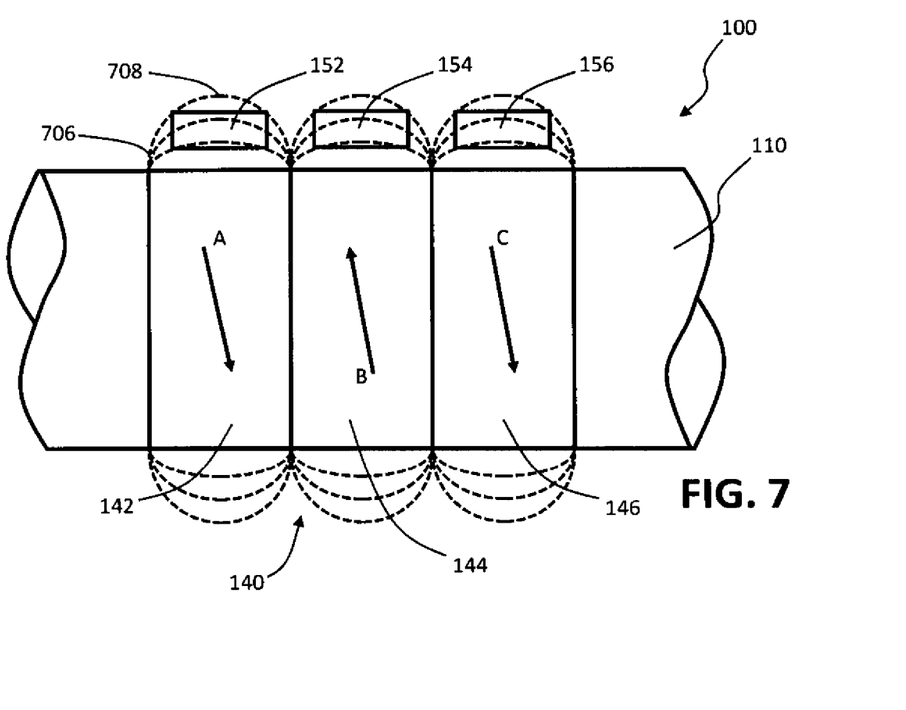
FIG. 7 is a side view of a torque sensing device in accordance with another embodiment of the present invention, wherein the torque sensing device is subject to an applied torque.

FIG. 7 shows the torque sensing device 100 of FIG. 6 in a state in which a torque has been applied to the shaft 100. As disclosed above with respect to FIG. 2 the application of torque to the shaft 110 causes the reorientation of the polarized magnetization in the magnetically conditioned regions 142, 144, 146 such that the magnetically conditioned regions 142, 144, 146 exhibit torque-induced magnetization components in the radial and axial directions. The torque-induced magnetic fields emanating from each of the outermost magnetically conditioned regions 142, 146 are equal in magnitude and polarity to one another, and equal in magnitude but of opposite polarity with respect to the torque-induced magnetic field emanating from the central magnetically conditioned region 144. In FIG. 7, arrows A, B, C show the reorientation of the magnetization in the magnetically conditioned regions 142, 144, 146 when torque is applied to the shaft. FIG. 7 also shows an external magnetic flux caused by torque applied to the shaft 110, where the external magnetic flux can be described in terms of a radial component 706 and an axial component 708.

With continued reference to FIGS. 6 and 7, magnetic field sensors 152, 154, 156 are axially aligned, and positioned proximate to the magnetically conditioned regions 142, 144, 146, respectively. Each individual magnetic field sensor 152, 154, 156 corresponds to an individual magnetically conditioned region 142, 144, 146. The magnetic field sensors 152, 154, 156 are oriented so as to sense the magnitude and polarity of the axial and/or radial field components arising in the spaces about the magnetically conditioned regions 142, 144, 146 as a result of the reorientation of the polarized magnetization from the quiescent circumferential direction to a generally helical direction. The magnetic field sensors 152, 154, 156 provide signal outputs reflecting the magnitude of the torque applied to the shaft 110.

Although FIGS. 6 and 7 each show the torque sensing device 100 having only one set of three magnetic field sensors 152, 154, 156, the torque sensing device may include a plurality of sets of three magnetic field sensors circumferentially spaced about the shaft 110, and proximate to the magnetoelastically active region 140 to increase the overall accuracy of the torque sensing device 100.

Figure 8:
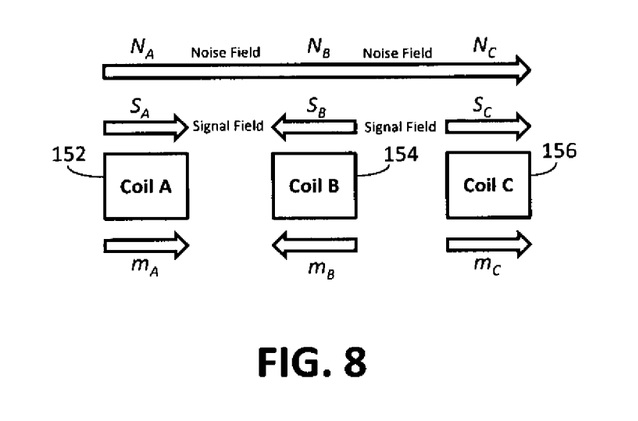
FIG. 8 is a diagram exemplifying a common mode configuration for magnetic field sensors in accordance with another embodiment of the present invention.

Turning to FIG. 8, shown therein is a diagram of the magnetic field sensors 152, 154, 156 of the tri-band embodiment of the present invention operating in common mode. The magnetic field sensors 152, 154, 156 include Coil A, Coil B and Coil C, respectively. $N_A$, $N_B$, and $N_C$ indicate the magnetic noise fields sensed by Coil A, Coil B, and Coil C, respectively. $S_A$, $S_B$, and $S_C$ indicate the torque-induced magnetic fields sensed by Coil A, Coil B, and Coil C, respectively. Due to the construction and processing of the magnetoelastically active region 140, $S_A$, $S_B$, and $S_C$ are of equal magnitude, $S_A$ and $S_B$ are of opposite direction, $S_B$ and $S_C$ are of opposite direction, and $S_A$ and $S_C$ are of the same direction. Arrows $m_A$, $m_B$, and $m_C$ indicate the sensitive directions, or positive directions of field measurement, of Coil A, Coil B, and Coil C, respectively. When operating in common mode, the magnetic field sensors 152, 154, 156 are oriented such that $m_A$ and $m_C$ are identical to each other and opposite $m_B$. As shown in FIG. 8, when operating in common mode, Coil A senses a signal that is equal to $S_A+N_A$, Coil B senses a signal that is equal to $S_B-N_B$, and Coil C senses a signal that is equal to $S_C+N_C$.

For instances in which $N_A$, $N_B$, and $N_C$ are of equal magnitude and direction, the effect of magnetic noise on the torque sensing device 100 is canceled by summing the output signals obtained from Coil A, Coil B, and Coil C in common mode, wherein the output obtained from Coil B is used twice. The resulting composite output signal is equal to $S_A+N_A+2S_B-2N_B-N_C=S_A+2S_B+S_C=4S_A=4S_B=4S_C$. Because the composite output signal is entirely torque-induced, one can easily determine the magnitude of torque applied to the shaft 110 based on the composite output signal.

In instances in which $N_A$, $N_B$, and $N_C$ are not of equal magnitude and direction, the composite output signal obtained by summing the individual output signals of Coil A, Coil B, and Coil C in common mode, wherein the output obtained from Coil B is used twice, is equal to $S_A+N_A+2S_B-2N_B+S_C+N_C4S_A+N_A-2N_B+N_C=4S_B+N_A-2N_B+N_C=4S_C+N_A-2N_B+N_C$.

Figure 9:
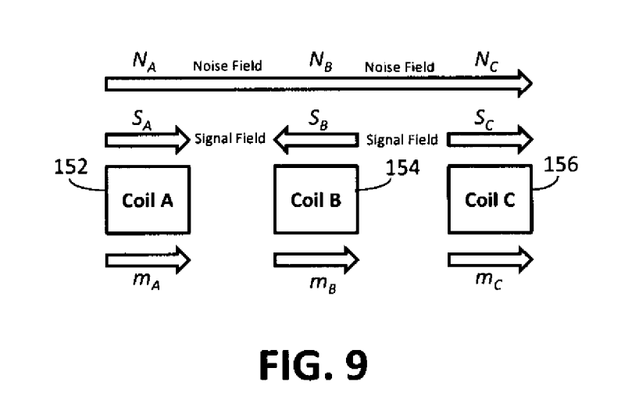
FIG. 9 is a diagram exemplifying a differential mode configuration for magnetic field sensors in accordance with another embodiment of the present invention.

FIG. 9 shows a diagram of the magnetic field sensors 152, 154, 156 of the tri-band embodiment of the present invention operating in differential mode. The magnetic field sensors 152, 154, 156 include Coil A, Coil B, and Coil C, respectively. $N_A$, $N_B$, and $N_C$ indicate the magnetic noise fields sensed by Coil A, Coil B, and Coil C, respectively. $S_A$, $S_B$, and $S_C$ indicate the torque-induced magnetic fields sensed by Coil A, Coil B, and Coil C, respectively. Due to the construction and processing of the magnetoelastically active region 140, $S_A$, $S_B$, and $S_C$ are of equal magnitude, $S_A$ and $S_B$ are of opposite direction, $S_B$ and $S_C$ are of opposite direction, and $S_A$ and $S_C$ are of the same direction. Arrows $m_A$, $m_B$, and $m_C$ indicate the sensitive directions, or positive directions of field measurement, of Coil A, Coil B, and Coil C, respectively. When operating in differential mode, the magnetic field sensors 152, 154, 156 are oriented such that $m_A$, $m_B$, and $m_C$ are identical. As shown in FIG. 9, when operating in differential mode, Coil A senses a signal that is equal to $S_A+N_A$, Coil B senses a signal that is equal to $-S_B+N_B$, and Coil C senses a signal that is equal to $S_C+N_C$.

In instances in which $N_A$, $N_B$, and $N_C$ are not of equal magnitude and direction, a composite output signal is obtained by summing the individual output signals of Coil A, Coil B, and Coil C in differential mode, wherein the output signal obtained from Coil B is used twice. The composite output signal is equal to $S_A+N_A-2S_B+2N_B+S_C+N_C=N_A+2N_B+N_C$. Therefore, when operating in differential mode, the present invention is capable of measuring the undesirable magnetic field noise that affects the set of magnetic field sensors 152, 154, 156.

Figure 10:
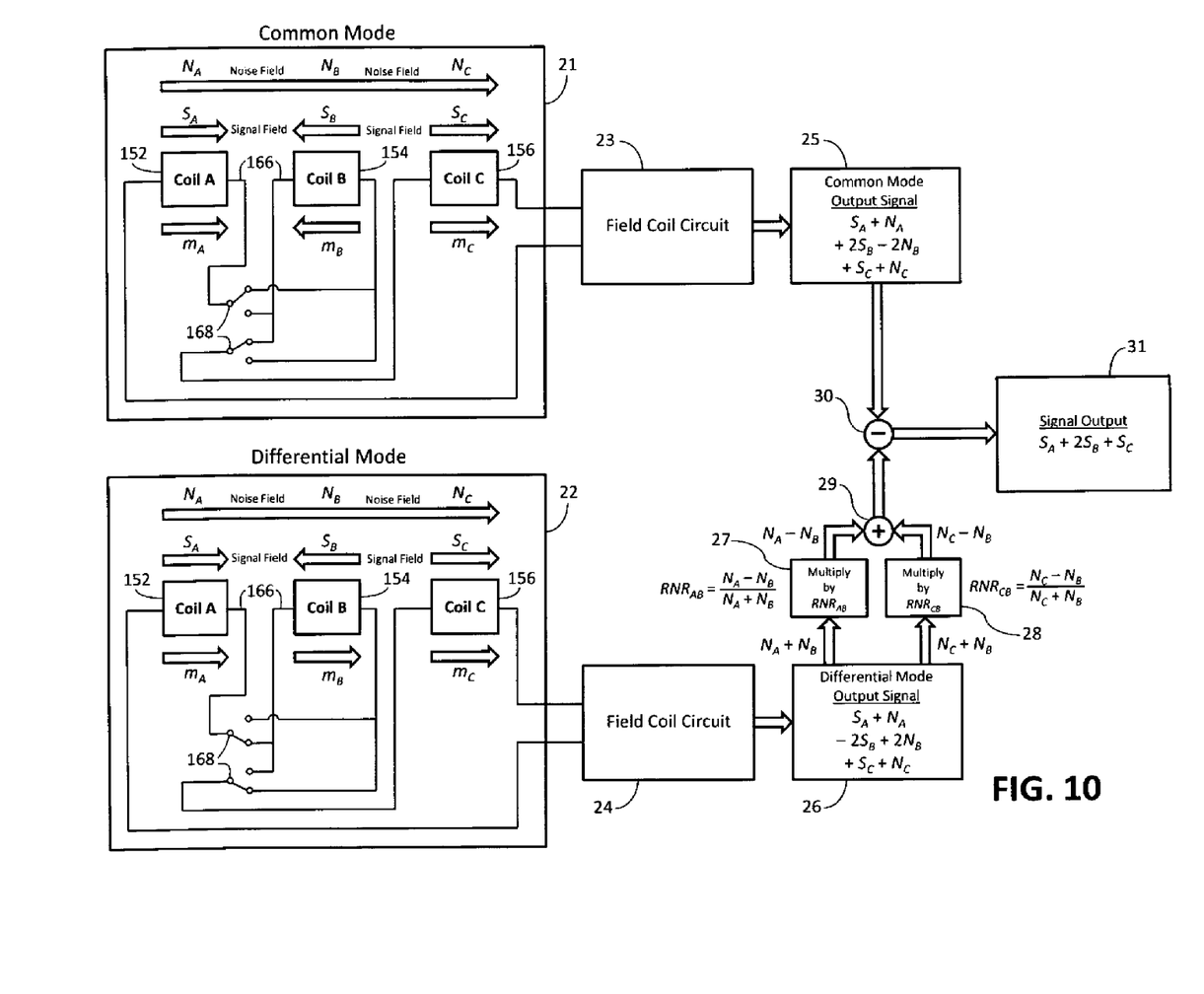
FIG. 10 is a block diagram demonstrating the operation of another embodiment of the present invention.

FIG. 10 is a block diagram depicting the operation of the tri-band embodiment of the present invention. Referring to block 21, Coil A, Coil B, and Coil C are shown axially aligned, connected in series by conductors 166. Block 21 shows Coil A, Coil B, and Coil C configured in common mode (signal detection mode), with the sensitive directions $m_A$, $m_C$ of Coil A and Coil C identical to one another and opposite the sensitive direction $m_B$ of Coil 13. Coil A, Coil B, and Coil C provide output signals to a field coil circuit, represented by block 23 in common mode, which processes the output signals obtained from the magnetic field sensors 152, 154, 156. The individual output signals obtained from Coil A, Coil B, and Coil C are summed, wherein the output obtained from Coil B is used twice, resulting in a composite common mode output signal represented by block 25. The present invention includes a means for storing each of the output signals obtained during common mode operation.

With continued reference to FIG. 10, Block 22 shows Coil A, Coil B, and Coil C configured in differential mode (noise detection mode). Coil A, Coil B, and Coil C are shown axially aligned, connected in series by conductors 166, as in common mode. Unlike common mode, in differential mode, the sensitive directions $m_A$, $m_B$, and $m_C$ of Coil A, Coil B, and Coil C are identical. Coil A, Coil B, and Coil C provide output signals to the field coil circuit, represented by block 24 in differential mode, which process the output signals obtained from the magnetic field sensors 152, 154, 156. The individual output signals obtained from Coil A, Coil B, and Coil C may be summed, wherein the output obtained from Coil B is used twice, resulting in a composite differential mode output signal represented by block 26. The present invention includes a means for storing each of the output signals obtained during differential mode operation. For instance, components of the composite differential mode output signal may be stored separately, wherein one component is equal to $S_A+N_A-S_B+N_B=N_A+N_B$, and another component is equal to $S_C+N_C-S_B+N_B=N_C+N_B$.

The transition from common mode to differential mode is achieved by switching the sensitive direction $m_B$ of Coil B from a common mode to a differential mode orientation. Switching may be performed by any appropriate electrical or mechanical means. In FIG. 5, the transition from common mode to differential mode is facilitated by switches 168 that, when activated, effectively reverse the sensitive direction $m_B$ of Coil 13. To ensure proper functionality of the torque sensing device 100, the switching frequency of the circuit incorporating the magnetic field sensors 152, 154, 156 should be greater than the circuit bandwidth.

With continued reference to FIG. 10, components of the composite differential mode output signal (block 26) are multiplied by their respective residual noise ratios to obtain the products represented by blocks 27 and 28. Specifically, the component representing $N_A+N_B$ is multiplied by $RNR_{AB}$, and the component representing $N_C+N_B$ is multiplied by $RNR_{CB}$. The resulting products (blocks 27 and 28) are summed (block 29), and the result of the summation is processed through a subtraction circuit (block 30) and thereby subtracted from the composite common mode output signal (block 25). The resulting difference (block 31) is a measure of the torque-induced magnetic field, with the effects of all noise-induced magnetic fields removed. The mathematical operations required for the operation of the present invention may be performed by any appropriate means including discrete components, microcontroller, or state machine.

The residual noise ratios for the tri-band configuration may be determined by the same procedure described above for determining the residual noise rations in the dual-band configuration. For the tri-band configuration, the steps of the procedure are performed a first time, wherein $RNR_{AB}$ is determined based on output from Coil A and Coil B. The steps are performed a second time, wherein $RNR_{CB}$ is determined based on output from Coil C and Coil B. It should only be necessary to determine $RNR_{AB}$ and $RNR_{AB}$ once for each instance of the invention, as part of the initial prototype development and evaluation process. $RNR_{AB}$ may be expressed as $(N_A-N_B)/(N_A+N_B)$, and $RNR_{CB}$ may be expressed as $(N_C-N_B)/(N_C+N_B)$.

As described in the '953 publication, the conventional method of using a tri-band configuration is to use two physical magnetic field sensors 154 in the central position (Coil B position), resulting in a total of four magnetic field sensors 152, 154, 156. The two central magnetic field sensors 154 cannot occupy the same physical space around the shaft 110, nor can they measure the same axial field in a magnetic field gradient. This results in mathematical magnetic field noise cancellation errors due to the fact that there are two magnetic field sensors 154 used to obtain the measurement representing $S_B$, however, those two magnetic field sensors 154 will not measure identical magnetic fields. Therefore the conventional method is incapable of completely canceling magnetic field noise, even when the magnetic field noise has a linear gradient through all the magnetic field sensors 152, 154, 156 in the axial direction.

The tri-band configuration of the present invention overcomes the incapability of the conventional method by employing a single magnetic field sensor 154 in the central position (Coil B position). The output from the single central magnetic field sensor 154 is used twice in obtaining a composite common mode output signal, and twice in obtaining a composite differential mode output signal. The present invention may include an additional multiplexor (not shown) to achieve this function. By employing only three, rather than four, magnetic field sensors 152, 154, 156, the present invention cancels noise more effectively than the conventional method described by the prior art.

Compared to the conventional four-detector implementation, the tri-band topology of the present invention will exhibit an improvement in the residual noise $(N_A-2N_B+N_C)$ apparent in the signal output when unwanted external magnetic field noise is present in the environment of the torque sensing device 100. This improvement is achieved because physical differences between multiple central magnetic field sensors 154 are removed, spatial magnetic field noise measurements of Coil B are identical for both pairs (Coils A and B, and Coils B and C), which is critical to eliminate linear magnetic field gradients, and axial measurement distance can be reduced significantly to approximate a linear magnetic field noise gradient in a non-linear magnetic field noise environment. However, depending on the severity of the non linear magnetic field gradients as measured by the three magnetic field sensors 152, 154, 156, the residual noise in the signal may still be significant. Therefore, the residual noise ratios for the tri-band configuration need to be measured.

Another tri-band embodiment of the present invention exists in which the central magnetically conditioned region 144 of FIG. 6-10 is replaced by a non-magnetically conditioned region. This embodiment operates identically to that described with respect to FIGS. 6-10, with the exception that Coil B, does not sense any torque-induced magnetic fields. This embodiment allows for the use of smaller magnetic field sensors 152, 154, 156 positioned closer to one another, and for outermost magnetically conditioned regions 142, 146 to be positioned closer to one another, thus improving the effectiveness of the torque sensing device.

There are several direct industrial applications of the present invention including, but not limited to, measuring input and output torque on a transmission, power assist steering, power assist pedaling in bicycles, agricultural combines (sensing the stiffness of the material being cut), tracker PTO, weaver machines, pylon drilling, etc.

Although certain presently preferred embodiments of the disclosed invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

What is claimed is:

1. A torque sensing device comprising:
  a magnetoelastic torque to magnetic field transducer having a first magnetically conditioned region and a second, oppositely polarized magnetically conditioned region;
  a first magnetic field sensing device positioned proximate to the first magnetically conditioned region;
  a second magnetic field sensing device positioned proximate to the second magnetically conditioned region; and
  means for switching between a first electrical connection state and a second electrical connection state,
  wherein, in the first connection state, the first magnetic field sensing device and the second magnetic field sensing device are oppositely polarized, and wherein, in the second connection state, the first magnetic field sensing device and the second magnetic field sensing device are polarized in the same direction.

2. The torque sensing device according to claim 1, further comprising a cylindrical shaft onto or into which the first and second magnetically conditioned regions are disposed.

3. The torque sensing device according to claim 1, wherein when the torque sensing device is in a quiescent state, the first and second magnetically conditioned regions are magnetically polarized in opposite circumferential directions.

4. The torque sensing device according to claim 1, wherein the first and second magnetic field sensors are axially aligned and define a magnetic field sensor pair.

5. The torque sensing device according to claim 4, further comprising a plurality of circumferentially spaced magnetic field sensor pairs.

6. The torque sensing device according to claim 1, wherein, in each of the first and second connection states, the first and second magnetic field sensors provide output signals representative of magnetic fields sensed by the first and second magnetic field sensors.

7. The torque sensing device according to claim 6, further comprising means for storing the output signals provided by the first and second magnetic field sensors.

8. The torque sensing device according to claim 6, further comprising circuitry means for summing the output signals provided by the first and second magnetic field sensors.

9. The torque sensing device according to claim 6, further comprising circuitry means for calculating the value of a torque applied to the torque sensing device based on the output signals provided by the first and second magnetic field sensors in the first connection state and the output signals provided by the first and second magnetic field sensors in the second connection state.

10. The torque sensing device according to claim 9, wherein the circuitry means for calculating the value of the torque applied to the torque sensing device is configured to cancel the effects of magnetic field noise.

11. The torque sensing device according to claim 1, further comprising:
a third magnetically conditioned region disposed such that the second magnetically conditioned region is between the first magnetically conditioned region and the third magnetically conditioned region; and
a third magnetic field sensing device positioned proximate to the third magnetically conditioned region,
wherein the first magnetic field sensing device and the third magnetic field sensing device are polarized in the same direction.

12. The torque sensing device according to claim 11, further comprising a cylindrical shaft having the first, second, and third magnetically conditioned regions disposed thereon.

13. The torque sensing device according to claim 11, wherein when the torque sensing device is in a quiescent state, the first and second magnetically conditioned regions are magnetically polarized in opposite circumferential directions, and wherein when the torque sensing device is in a quiescent state, the first and third magnetically conditioned regions are magnetically polarized in the same circumferential direction.

14. The torque sensing device according to claim 11, wherein the first, second, and third magnetic field sensors are axially aligned and define a magnetic field sensor unit.

15. The torque sensing device according to claim 14, further comprising a plurality of circumferentially spaced magnetic field sensor units.

16. The torque sensing device according to claim 11, wherein, in each of the first and second connection states, the first, second, and third magnetic field sensors provide output signals representative of magnetic fields sensed by the first, second, and third magnetic field sensors.

17. The torque sensing device according to claim 16, further comprising means for storing the output signals provided by the first, second, and third magnetic field sensors.

18. The torque sensing device according to claim 16, further comprising circuitry means for summing the output signals provided by the first, second, and third magnetic field sensors.

19. The torque sensing device according to claim 16, further comprising circuitry means for calculating the value of a torque applied to the torque sensing device based on the output signals provided by the first, second, and third magnetic field sensors in the first connection state and the output signals provided by the first, second, and third magnetic field sensors in the second connection state.

20. A method for determining the amount of torque applied to a torque sensing device comprising the steps of:
providing a magnetoelastic torque to magnetic field transducer having a first magnetically conditioned region and a second, oppositely polarized magnetically conditioned region;
providing a first magnetic field sensor positioned proximate to the first magnetically conditioned region, the first magnetic field sensor having a sensitive direction;
providing a second magnetic field sensor positioned proximate to the second magnetically conditioned region, the second magnetic field sensor having a sensitive direction;
configuring the first and second magnetic field sensors in a first connection state wherein the sensitive directions of the first and second magnetic field sensors are opposite one another;
obtaining a first output signal from each of the first and second magnetic field sensors in the first connection state;
causing a switching function to reconfigure first and second magnetic field sensors in a second connection state wherein the sensitive directions of the first and second magnetic field sensors are identical;
obtaining a second output signal from each of the first and second magnetic field sensors in the second connection state; and
calculating the torque applied to the torque sensing device based on the first and second output signals.

\* \* \* \* \*